(12) United States Patent
Wielstra (10) Patent No.: US 9,347,684 B2
(45) Date of Patent: May 24, 2016

(54) PREVENTION OR REDUCTION OF SCALING ON A HEATER ELEMENT OF A WATER HEATER

(75) Inventor: Ytsen Wielstra, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 750 days.

(21) Appl. No.: 13/700,757

(22) PCT Filed: Jul. 13, 2011

(86) PCT No.: PCT/IB2011/053133
§ 371 (c)(1),
(2), (4) Date: Nov. 29, 2012

(87) PCT Pub. No.: WO2012/011026
PCT Pub. Date: Jan. 26, 2012

(65) Prior Publication Data
US 2013/0089310 A1   Apr. 11, 2013

(30) Foreign Application Priority Data
Jul. 22, 2010   (EP) ..................................... 10170384

(51) Int. Cl.
| | | |
|---|---|---|
| *H05B 1/02* | (2006.01) | |
| *F24H 9/20* | (2006.01) | |
| *F22B 1/30* | (2006.01) | |
| *F24D 19/00* | (2006.01) | |
| *F24H 9/00* | (2006.01) | |

(52) U.S. Cl.
CPC ................ *F24H 9/2021* (2013.01); *F22B 1/30* (2013.01); *F24D 19/0092* (2013.01); *F24H 9/0047* (2013.01); *Y02E 20/14* (2013.01)

(58) Field of Classification Search
CPC ........ F22B 1/30; F24D 19/0092; F24J 9/2021; F24H 9/0047
USPC .................. 99/285; 204/143, 194, 229.5, 235; 205/687, 701, 743, 744, 790.5, 793.5
See application file for complete search history.

(56) References Cited

U.S. PATENT DOCUMENTS

| | | | |
|---|---|---|---|
| 3,476,673 A | 11/1969 | Stiles | |
| 4,692,591 A | 9/1987 | Cooley et al. | |
| 5,376,242 A * | 12/1994 | Hayakawa | ..................... 205/744 |
| 5,916,490 A | 6/1999 | Cho | |
| 6,139,717 A * | 10/2000 | Hayakawa | ..................... 205/744 |
| 2001/0018866 A1 | 9/2001 | Fischer | |
| 2003/0075456 A1 | 4/2003 | Collins et al. | |
| 2003/0192436 A1 | 10/2003 | Schreiner et al. | |

FOREIGN PATENT DOCUMENTS

| | | | |
|---|---|---|---|
| JP | 04311598 A | | 11/1992 |
| JP | 7047368 | * | 2/1995 |

(Continued)

*Primary Examiner* — Thien S Tran (57) ABSTRACT

The invention provides a method of using a water heater arranged for heating an aqueous liquid wherein the water heater comprises a heating element to heat aqueous liquid in the water heater. The method comprising (a) heating aqueous liquid in the water heater with the heating element, wherein the heating element is in contact with the aqueous liquid; and (b) applying a first AC voltage between the heating element and a counter electrode and applying a second AC voltage between the heating element and the counter electrode, wherein the second AC voltage has a second AC frequency selected from the range of 0.02 Hz-5 Hz and wherein the ratio between the first AC frequency and the second AC frequency is 2 or more.

18 Claims, 6 Drawing Sheets

(56) References Cited

FOREIGN PATENT DOCUMENTS

| JP | 7047368 A | 2/1995 |
|---|---|---|
| JP | 9220577 A | 8/1997 |
| JP | 2002336861 A | 11/2002 |
| JP | 2005523807 A | 8/2005 |
| WO | 2007007241 A1 | 1/2007 |

* cited by examiner

PREVENTION OR REDUCTION OF SCALING ON A HEATER ELEMENT OF A WATER HEATER

FIELD OF THE INVENTION

The invention relates to a method of using a water heater and to a water heater arrangement that can be used for such method. The invention also relates to an electronic device comprising such water heater arrangement.

BACKGROUND OF THE INVENTION

Water heating devices are applied in all kind of applications, such as steam irons, electric kettles, hot drink vending machines, etc. A problem with such devices is that scale may form on the heating elements that are in contact with the water.

During operation of for instance a steam generation device, water is supplied to a part of the water infrastructure where it is heated, such as in the (external) boiler of a system iron, as a consequence of which scale may be formed. If the scale is not (periodically) removed clogging up may occur, as a result of which the performance of the steam generation device may decrease and, eventually, the steam generation device may not be fit to be used anymore.

WO2007007241 for instance describes a steam ironing system comprising a steam iron and a boiler system having a boiler for generating steam, wherein the steam iron and the boiler are connected to each other through a steam hose. During operation of the boiler system, scale is formed in the boiler. For the purpose of removing the scale from the boiler, a rinsing process is performed on the boiler system at regular intervals. During the rinsing process, a rinse valve connected to a water outlet positioned at a bottom of the boiler is opened, and water is discharged from the boiler to a rinse container. In the process, scale particles are carried along with the flow of water. Preferably, pressure is built up inside the boiler prior to opening the rinse valve, so that the water is forcibly ejected from the boiler, whereby the effectiveness of the rinsing process is enhanced. During the rinsing process or at the end of the rinsing process, scale solvent may be introduced into the boiler.

US 2003192436 describes a method for the generation of steam, in particular for a cooking device, whereby a fluid within a steam generator container is brought to the boil by the heating of at least one heatable wall surface of the steam generator container. Said fluid is set in rotation by the heating and thus pressed against the heatable wall surface, due to centrifugal forces arising from the rotation. The steam generated as a result of the evaporation of at least a part of the fluid escapes from the steam generator container through a steam outlet and droplets of fluid entrained in the steam are separated out by at least one first rotor, rotatably mounted in the steam generator container, whereby the fluid is set in rotation by said rotor. The invention further relates to a device using the above method.

US2001018866 describes an arrangement for indicating the calcification status of flow heaters, particularly in espresso machines, with the flow heater having a cold-water inlet line and a hot-water outflow line, and which is intended to precisely indicate the calcification status, yet have an uncomplicated design. For this purpose, a differential-pressure fluid gauge is provided, with the gauge having two pressure chambers separated by a diaphragm, with one of the pressure chambers being in a fluid-conducting connection with the cold-water inlet line and the other pressure chamber being in a fluid-conducting connection with the hot-water outflow. The diaphragm acted upon by the pressure difference between the two chambers is coupled to indicator elements.

Hard water containing significant amount of $Ca^{2+}$ and $HCO_3^-$ (bicarbonate) may form scale ($CaCO_3$) upon temperature increase via the following chemical reaction:

$$Ca(HCO_3)_2 \rightarrow CaCO_3 + H_2O + CO_2$$

Especially boiling water will separate scale, the scale will form in the water but also on the heating element itself as it has the highest temperature. In time scale will grow on the heating element and when internal stresses increase it will break loose from the element. Several treatments of water to prevent scaling have been claimed in the literature. A well known method is the use of ion exchangers were $Ca^{2+}$ is exchanged for $Na^+$ or $H^+$. A second well known method is the use of phosphonate that in small amount is added to the water and inhibits the formation of seeding crystals in the hard water, effectively preventing the growing of crystals and thus the formation of scale (see also the cited art above).

In the former a cartridge needs to be used with the ion exchange resin inside. After depletion the cartridge needs to be regenerated or replaced with a new one. In the latter case continuously phosphonate needs to be added as the phosphonates have limited stability at pH 7-8.5, the pH of hard water. The continuous addition can be implemented for example by using a hard-pressed tablet that very slowly liberates the phosphonates into the water. This way of working has been used in prior art steam irons. However, chemicals are added into the water which may be a drawback, for instance when water is (also) meant to be potable.

Physical methods to prevent scale formation have also been claimed but these may have a less clear working principle and the efficacy may sometimes even be doubtful in some cases. For example the use of (electro) magnets placed on water tubing for scale prevention is an example of a poorly understood and non-repeatable scale prevention method.

SUMMARY OF THE INVENTION

Hence, it is an aspect of the invention to provide an alternative method to prevent or reduce scaling in a water heater and/or an alternative water heater arrangement, which preferably prevents or at least partly obviates one or more of above-described drawbacks and/or relatively more complicated constructions or solutions of the prior art. It is especially an aim of the invention to prevent or reduce the formation of scale on heating elements (such as a heatable wall or an immersion heater) in heating appliances and/or to decalcify calcified surfaces of such heating elements.

Here, electrochemical scale prevention and/or removal from an aqueous liquid such as water is proposed. A principle could be to have two electrodes in the water connected with a DC power supply. At the anode (+ electrode) oxidation is taking place. At the cathode (− electrode) reduction is taking place; in practice this means that at the cathode water is reduced:

$$2H_2O + O_2 + 4e^- \rightarrow 4OH^-$$

The formation of $OH^-$ will increase pH locally and transform the $HCO_3^-$ into $CO_3^-$. The $CO_3^-$ will react with the $Ca^{2+}$ and calc will precipitate on the cathode.

At the anode oxidation takes place. When the anode material is oxidation resistant then water is oxidized towards oxygen and acid. The acid will dissolve calc that has been deposited on the electrode and the electrode will remain clean when used in heated (hard) water:

$$2H_2O \rightarrow O_2 + 4H^+ + 4e^-$$

When the anode is reactive it may be oxidized. For example metal anodes will dissolve unless very stable metal (Pt), certain transition metal oxides or carbon anodes are used. Calcified steel can be decalcified by applying a positive voltage but its effect is limited by the corrosion resistance of the metal making only small voltages/currents feasible.

In summary, such simple setup may remove scale from the water by depositing it on a cathode and keeping the (oxidation resistant) anode clean. A drawback, besides the need for corrosion resistant anode material, may be that the cathode needs to be cleaned at regular intervals. Hence, the invention especially provides solutions that may also solve this problem. Below, some preferred embodiments are described in more detail.

It has surprisingly been found that a method wherein two AC signals with different frequencies are applied, scaling can be reduced, prevented or removed. Hence, the invention especially provides a method of using a water heater arranged for heating an aqueous liquid wherein the water heater comprises a heating element to heat aqueous liquid in the water heater, the method comprising:
a. heating aqueous liquid in the water heater with the heating element, wherein the heating element is in contact with the aqueous liquid; and
b. applying a first AC voltage between the heating element and a counter electrode and applying a second AC voltage (or more AC voltages) between the heating element and the counter electrode, wherein the second AC voltage has a second AC frequency selected from the range of 0.02 Hz-5 Hz and wherein the ratio between the first AC frequency and the second AC frequency is 2 or more.

Optionally, a DC component may be added. Below, the two or more AC components, and the optional DC component, are discussed in more detail, respectively.

AC

When an alternating current (AC) is supplied to the electrodes, alternating acid and base will be formed at the electrodes. While scale is formed during boiling it will substantially not adhere to the electrode walls as it is constantly dissolved and re-precipitated at the electrode surface. The method can also be used to decalcify already calcified surfaces. Especially at lower frequencies the adhesion of scale is lowered that much that it is spontaneously released from the surface. The scale is released better the longer the calcified surface is in the positive mode when acid is generated. It may be that also corrosion of the metal can occur during this period. The sensitivity to corrosion of the metal electrodes may be the limiting factor for the choice of current and frequency that can be used like it is in DC descaling. Overall however, it has been found that the loosening of the scale occurs easier then that the metal is oxidized when using AC instead of DC. Further, higher voltages and higher currents can be used in AC then in DC making the decalcifying effect of the electrochemical treatment in AC much more efficient then in DC.

Hence, the invention provides a method using a water heater arranged for heating an aqueous liquid (further indicated as "heater") wherein the heater comprises a metal heating element to heat aqueous liquid in the heater, the method comprising:
a. heating aqueous liquid in the heater with the heating element, wherein the heating element is in contact with the aqueous liquid; and
b. applying a first AC voltage (and a second AC voltage) between the heating element and a counter electrode.

This method can advantageously be used to (substantially) prevent scale formation on the (surface of the) heating element, when using such heater, but this method can also be used to remove already formed scale on the (surface of the) heating element. The scale may neither adhere on the (surface of the) heating element nor on the counter electrode and will substantially remain floating in the water.

Hence, the invention further provides a method for the prevention or reduction of scale formation on a metal heating element of a water heater arranged for heating an aqueous liquid ("heater"), the method comprising:
a. contacting the heating element with the aqueous liquid, while preferably heating the aqueous liquid (with preferably the heating element); and
b. applying a first AC voltage (and a second AC voltage) between the heating element and a counter electrode.

In an especially advantageous embodiment, the first AC voltage has a first AC frequency selected from the range of 0.1 Hz or higher, such as at least 1 Hz, such as up to 10000 Hz, like especially in the range of 1-10000 Hz (i.e. 1 Hz-10 Khz), especially 5-5000 Hz, like 5-1000 Hz. The first AC voltage applied may depend upon the configuration of the heating element and counter electrode, but may for instance be in the range of about 1-100 V, such as for instance 5-50 V.

Especially beneficial is the use of AC signals that have a triangular shape. In that case the time the current is at its peak is shorter then compared to e.g. sinusoidal or block-shape waves reducing the risk of corrosion. In a specific embodiment, the first AC voltage has a triangular wave shape.

Application of the first AC voltage may be before, during, or after heating of the aqueous liquid. Preferably, the first AC voltage is applied during heating of the aqueous liquid. The phrase "applying a first AC voltage between the heating element and a counter electrode" and similar phrases relate to the embodiment(s) that the heating element and the counter electrode are both in contact with the aqueous liquid. Hence, the phrase "applying a first AC voltage between the heating element and a counter electrode" refers to "applying a first AC voltage between the heating element and a counter electrode, while the heating element and the counter electrode are in contact with the aqueous liquid. The phrase "in contact" include embodiments wherein at least part of the item is in contact. For instance, at least part of the heating element or at least part of the counter electrode may be in contact with the aqueous liquid, respectively.

The invention also provides an arrangement with which the method of the invention may be applied. The invention therefore provides in an embodiment a water heater arrangement comprising a water heater arranged for heating an aqueous liquid, the water heater comprising a heating element to heat the aqueous liquid in the water heater, the heating element arranged to be in contact with the aqueous liquid, and an electrical power supply, arranged to apply the first AC voltage between the heating element and a counter electrode.

AC/AC

As mentioned above, it has surprisingly been found that further increase of efficiency in descaling by the first AC can be achieved by applying an additional AC to the first AC.

When two (or more) AC voltages are applied at the same time, a lower frequency signal and a higher frequency signal are used. In general it has been found that the lower the frequency the better the descaling effect of the current may be. When however the frequency is lowered too much also corrosion may set in. At a higher frequency the corrosion may be suppressed but also the descaling effect may be limited. Surprisingly it has been found that when a high frequency AC signal is superimposed onto a low frequency AC signal the corrosion effect of the low frequency signal is suppressed while the descaling effect of the low frequency AC signal still functions.

Hence, in a further aspect the invention provides a method of using a water heater ("heater") arranged for heating an aqueous liquid wherein the heater comprises a metal heating element to heat aqueous liquid in the heater, the method comprising:
a. heating aqueous liquid in the heater with the heating element, wherein the heating element is in contact with the aqueous liquid; and
b. applying a first AC voltage between the heating element and a counter electrode and applying a second AC voltage (and optionally one or more further AC voltages) between the heating element and the counter electrode, wherein the second AC voltage has a second AC frequency preferably selected from the range of 0.02 Hz-5 Hz, especially 0.1 Hz-2.5 Hz, and wherein the ratio between the first AC frequency and the second AC frequency is preferably 2 or more, such as in the range of 2-1000, especially at least 5, such as in the range of 5-1000.

This method can advantageously be used to (substantially) prevent scale formation on the (surface of the) heating element, when using such heater, but this method can also be used to remove already formed scale on the (surface of the) heating element. The scale may neither adhere on the (surface of the) heating element nor on the counter electrode and will substantially remain floating in the water.

The invention thus also provides a method for the prevention or reduction of scale formation on a metal heating element of a heater arranged for heating an aqueous liquid, the method comprising:
a. contacting the heating element with the aqueous liquid, while preferably heating the aqueous liquid (preferably with the heating element); and
b. applying a first AC voltage between the heating element and a counter electrode and applying a second AC voltage (and optionally one or more further AC voltages) between the heating element and the counter electrode, wherein the second AC voltage has a second AC frequency preferably selected from the range of 0.02 Hz-5 Hz, especially 0.1 Hz-2 Hz, and wherein the ratio between the first AC frequency and the second AC frequency is preferably 2 or more, such as in the range of 2-1000, especially at least 5, such as in the range of 5-1000, like up to 500.

As mentioned above, advantageously and surprisingly a high frequency AC signal superimposed onto a low frequency AC signal suppresses the corrosion effect of the low frequency signal while the descaling effect of the low frequency AC signal still functions. Further, as defined above, the first AC voltage preferably has a first AC frequency selected from the range of 0.1 Hz or higher, such as at least 1 Hz, like up to 10000 Hz, such as in the range of 1-10000 Hz, especially 5-1000 Hz. Hence, the first AC voltage and the second AC voltage have different frequencies.

The phrase "applying a second AC voltage" and similar phrases do not exclude the application of a further (a third, . . . ) AC voltage. Hence, in a further embodiment a first AC voltage and a second AC voltage, as defined herein, and optionally one or more further AC voltages may be applied. Thus, in a specific embodiment, the invention also includes a method as defined above, further comprising applying an additional AC voltage (in addition to the first and the second AC voltages) between the heating element and the counter electrode. Therefore, the phrase "applying a second AC voltage (and optionally one or more further AC voltages)" is used. For the sake of understanding, herein it is often referred to "second AC voltage".

The second AC voltage applied may depend upon the configuration of the heating element and counter electrode, but may for instance also be in the range of about 1-100 V, such as for instance 5-50 V. The frequencies of the second and optional further AC voltages are preferably different from each other, and may optionally (independently) all comply with a preferred ratio of 2 or more of the frequency of the first AC voltage and the frequency of the second and further AC voltages, respectively. Further AC voltages may however also have a frequency selected from the range of 0.1 Hz or higher, especially 1 Hz or higher, like up to 10000 Hz, such as in the range of 1-10000 Hz, especially 5-1000 Hz. However, at least one set of two AC voltages comply with the indicated ratio range of at least 2, such as in the range of 2-1000, especially at least 5, such as in the range of 5-1000.

In a further specific embodiment, wherein at least two AC voltages are applied, preferably both the first AC voltage and the second AC voltage have a triangular wave shape. Optional one or more further AC voltages may also have a triangular wave shape.

Application of the first and second AC voltages may be before, during, or after heating of the aqueous liquid. Preferably, the first and the second AC voltages are applied during heating of the aqueous liquid.

The invention also provides an arrangement with which the method of the invention may be applied. The invention therefore provides in an embodiment a water heater arrangement comprising a water heater arranged for heating an aqueous liquid, the water heater comprising a heating element to heat the aqueous liquid in the water heater, the heating element arranged to be in contact with the aqueous liquid, and an electrical power supply, arranged to apply a first AC voltage between the heating element and a counter electrode, wherein the electrical power supply is further arranged to apply a second AC voltage and optionally one or more further AC voltages) between the heating element and the counter electrode, wherein the second AC voltage has a second AC frequency selected from the range of 0.02 Hz-5 Hz, and wherein the ratio between the first AC frequency and the second AC frequency is 2 or more.

Additional DC

It has surprisingly been found that further increase of efficiency in descaling by AC can be achieved by applying an additional DC offset to the AC. This means that the calcified surface (e.g. wall of a flow through heater or an immersed curled heating element) is set at a positive voltage with the counter electrode negatively. Now, a much higher (DC) voltage can be applied when combined with the AC then as standalone DC. DC voltages normally not usable to decalcify the surface due to corrosion can now be used. The AC current is tempering the corrosion effect of the DC while the scale loosening effect adds up to the AC decalcifying.

Hence, in a further aspect, the invention provides a method further comprising applying a DC voltage between the heating element and the counter electrode, wherein the DC voltage is preferably at least 0.5 V, more preferably at least 1.0 V, especially at least 1.2 V, and wherein the heating element is chosen as positive electrode. In general, the DC voltage will be in the range of about 1.0-10 V, such as 1.5-10 V, especially 1.5-6 V. Further, as defined above, the first AC voltage preferably has a first AC frequency selected from the range of 1 Hz or higher, such as in the range of 1-1000 Hz, especially 5-1000 Hz.

Another benefit of a DC offset to an AC voltage is the following. When AC is applied to a system where the electrodes are of different size the corrosion resistance of the smallest electrode may determine the corrosion resistance of the whole setup as it has the highest current density making it the most sensitive to corrosion. When for example in a flow through heater a small counter electrode is inserted to descale the wall (assuming the wall being connected to the heating element), the small electrode will determine the current and frequency that can be applied. When a DC offset is applied with the right polarity, the wall (+) will benefit from the additional descaling while the small electrode is protected against corrosion as it is connected negative (−).

Application of the first AC voltage (and second AC voltage) and DC voltage may be before, during, or after heating of the aqueous liquid. Preferably, the first AC voltage and the DC voltage are applied during heating of the aqueous liquid.

The invention also provides an arrangement with which the method of the invention may be applied. The invention therefore provides in an embodiment a water heater arrangement comprising a water heater arranged for heating an aqueous liquid, the water heater comprising a heating element to heat the aqueous liquid in the water heater, the heating element arranged to be in contact with the aqueous liquid, and an electrical power supply, arranged to apply a first AC voltage (and second AC voltage) between the heating element and a counter electrode, and wherein the electrical power supply is further arranged to apply a DC voltage between the heating element and the counter electrode, wherein the DC voltage is at least 0.5 V, more preferably at least 1.0 V, and wherein the heating element is arranged as positive electrode.

Surprisingly it has also been found that the superposition of a high frequency AC signal on a low frequency AC signal enables the use of low frequency AC signals (see also above). As very low frequency signals may especially be efficient in descaling, the auxiliary DC offset can be lowered. Overall the sensitivity to variation in aqueous liquid conductivity becomes lower making this setup more capable in handling different aqueous liquid types then single AC/DC combinations.

Hence, especially preferred is the combination of a first AC, a second (slow) AC and a DC voltage. The invention therefore also provides a method of using a water heater ("heater") arranged for heating an aqueous liquid wherein the heater comprises a metal heating element to heat aqueous liquid in the heater, the method comprising:
a. heating aqueous liquid in the heater with the heating element; and
b. applying a first AC voltage between the heating element and a counter electrode, applying a second AC voltage (and optionally one or more further AC voltages) between the heating element and the counter electrode, wherein the second AC voltage has a second AC frequency preferably selected from the range of 0.02 Hz-5 Hz, especially 0.1 Hz -2.5 Hz, wherein the ratio between the first AC frequency and the second AC frequency is preferably 2 or more, such as in the range of 2-1000, especially at least 5, such as in the range of 5-1000, and applying a DC voltage between the heating element and the counter electrode, wherein the DC voltage is preferably at least 0.5 V, more preferably at least 1.0 V, especially at least 1.2 V, and wherein the heating element is chosen as positive electrode.

This method can advantageously be used to (substantially) prevent scale formation on the (surface of the) heating element, when using such heater, but this method can also be used to remove already formed scale on the (surface of the) heating element. The scale may neither adhere on the (surface of the) heating element nor on the counter electrode and will substantially remain floating in the water.

The invention thus also provides a method for the prevention or reduction of scale formation on a metal heating element of a heater arranged for heating an aqueous liquid, the method comprising:
a. contacting the heating element with the aqueous liquid, while preferably heating the aqueous liquid (preferably with the heating element); and
b. applying a first AC voltage between the heating element and a counter electrode, applying a second AC voltage (and optionally one or more further AC voltages) between the heating element and the counter electrode, wherein the second AC voltage has a second AC frequency preferably selected from the range of 0.02 Hz-5 Hz, especially 0.1 Hz -2 Hz, wherein the ratio between the first AC frequency and the second AC frequency is preferably 2 or more, such as in the range of 2-1000, especially at least 5, such as in the range of 5-1000, and applying a DC voltage between the heating element and the counter electrode, wherein the DC voltage is preferably at least 0.5 V, more preferably at least 1.0 V, especially at least 1.2 V, and wherein the heating element is chosen as positive electrode.

Embodiments described above in relation to AC and AC/AC also apply to the AC/AC/DC embodiments.

Application of the first and second AC voltages and DC voltage may be before, during, or after heating of the aqueous liquid. Preferably, the first and second AC voltages and the DC voltage are applied during heating of the aqueous liquid.

The invention also provides an arrangement with which the method of the invention may be applied. The invention therefore provides in an embodiment a water heater arrangement comprising a water heater arranged for heating an aqueous liquid, the water heater comprising a heating element to heat the aqueous liquid in the water heater, the heating element arranged to be in contact with the aqueous liquid, and an electrical power supply, arranged to apply a first AC voltage between the heating element and a counter electrode, wherein the electrical power supply is further arranged to apply a second AC voltage (and optionally one or more further AC voltages) between the heating element and the counter electrode, wherein the second AC voltage has a second AC frequency selected from the range of 0.02 Hz-5 Hz, and wherein the ratio between the first AC frequency and the second AC frequency is 2 or more, and wherein the electrical power supply is further arranged to apply a DC voltage between the heating element and the counter electrode, wherein the DC voltage is at least 0.5 V, and wherein the heating element is arranged as positive electrode.

Further Embodiments

Herein, the aqueous liquid is especially water. The method may be used for hard and soft water, especially for water having a water conductivity of preferably at least 100 μS/cm.

The heating element can be immersed directly in the water or be arranged as (part of a) wall of the heater. In both cases the heater element (wall) acts as electrode and is electrically connected to the counter electrode. The (surface of the) heating element is thus in contact with the aqueous liquid in the heater. This is herein also indicated by the phrase "wherein the heating element is in contact with the aqueous liquid". Note that the term heating element thus refers to that part (element) that is in contact with the aqueous liquid and provides (when using the heater to heat the aqueous liquid) the heat from the heater to the aqueous liquid. It is on the heating element (or more especially its (part of the) surface that is in contact with the aqueous liquid) that scale may deposit. The term "heating element" may thus not necessarily refer to the actual heat generation device that generates the heat, but refers to that part/element, that transfers the heat to the aqueous liquid. In an embodiment, the term "heating element" may also refer to a plurality of heating elements.

The heating element for heating the aqueous liquid herein preferably comprises one or more metal parts for heating the liquid or is essentially from metal, such as a steel wall or a steel immersion heater. Hence, the heating element is herein also indicated as metal heating element. On this metal of the heating element that is in contact with the aqueous liquid, scale may deposit. Preferably, the heating element for heating the aqueous liquid herein preferably comprises one or more steel parts for heating the liquid or is essentially from steel. Hence, the heating element, or the part of the heating element in contact with the water is preferably made of steel. In a specific embodiment, the heating element is a steel heating element.

The term "counter electrode" may in an embodiment also refer to a plurality of counter electrodes. For instance, when more than one signal is applied, in principle different counter electrodes may be applied. In an embodiment, the applied signals are applied on separate counter electrodes wherein thus the counter electrode comprises a plurality of counter electrodes, and wherein the first AC voltage is applied between the heating element and a first counter electrode, and wherein the second AC voltage is applied between the heating element and a further counter electrode and/or wherein the DC voltage is applied between the heating element and a further counter electrode. Again, the further counter electrode for one signal may another further counter electrode for yet another signal. Especially when two or more AC signals applied, it may be an option to use for each AC signal a different counter electrode. Preferably, the DC voltage is applied to each set of heating element and counter electrodes.

Hence, the invention also provides an embodiment of the water heater arrangement wherein the counter electrode comprises a plurality of counter electrodes, and wherein the electrical power supply and the plurality of counter electrodes are arranged to apply the first AC voltage between the heating element and a first counter electrode, and to apply the second AC voltage between the heating element and a further counter electrode or to apply the DC voltage between the heating element and a further counter electrode. When both a second AC voltage and a DC voltage are applied, different or identical further counter electrodes may be applied. In a further embodiment, when using two or more AC voltages and a DC voltage, the DC voltage is applied to each set of counter electrode and heating element, and the two or more AC voltages are applied to the respective combinations of counter electrode and heating element.

The counter electrode may for instance be a stainless steel or a mixed metal oxide (MMO), a carbon based or a platinum electrode. Where the wall of the heater is used as counter electrode, preferably the counter electrode is of metal, more preferably of steel.

The term "steel" herein especially refers to stainless steel. Any grade of stainless steel can be applied. Preferably the steel contains both Cr and Ni (e.g. grade 304) while additional presence of small amounts of Mo is especially beneficial (e.g. grade 316 or higher). Alternatively more resistant metal (alloys) can be used like Inconel (Cr/Ni alloy). The higher the corrosion resistance of the steel the lower the frequency of the AC or the higher the DC offset or the voltage of the AC that can be applied improving the scale removal.

The term "water heater" is used to indicate a device that is arranged to heat an aqueous liquid, such as water. The term "water heater" (herein shortly indicated with "heater") may for instance refer to a steam generation chamber (based on heating an aqueous liquid). The heater may be of the flow through heater type. The heater may for instance heat the aqueous liquid in an embodiment via a heat generation device connected to the heater wall, wherein the wall (which is in contact with the aqueous liquid), is the heating element (for heating the aqueous liquid), or may for instance in an embodiment heat via an element in the aqueous liquid, such as water, such as in the case of an immersion type of heater (in which the heating element is in contact with the aqueous liquid), etc. Different types of heating elements may be applied (at the same time).

The term "water heater" may also refer to a (closed) boiler arranged to produce steam, to a (closed) boiler arranged to produce heated water, to a flow through heater or to a steamer. In a specific embodiment, the heater arranged for heating an aqueous liquid is selected from the group consisting of a flow through heater, a flow through steamer, a heater for heating water and a heater for producing steam. Included are also heater blocks where the heating element and e.g. the tube that carries the water are embedded in a block of aluminum.

Heating may be any heating at temperatures above room temperature, but especially refers to heating (of the aqueous liquid) above 50° C., such as especially heating the aqueous liquid in the heater to a temperature of at least 85° C. The term heating may thus include bringing at elevated temperatures, boiling and/or producing steam.

The heater may be any heater, such as a heater of a steam generation device (e.g. as used for a pressurized steam generator (sometimes also indicated as system iron)) for providing steam, a water heater for providing hot drinking water like in a hot liquid vending machine (e.g. for making coffee, tea, cappuccino, or hot chocolate, etc.), an electric kettle, a coffee maker (drip filter), an espresso machine, a pad coffee machine, a boiler (for internal heating of a house (domestic boiler) or of an apartment, an office building), an industrial boiler etc.), a water heater arranged in a washing machine or in a dish washer, or a hot-water based weed killing device (or sprayer) (arranged to providing hot water to kill weed).

Hence, in a further aspect, the invention provides an electronic device comprising a heater arrangement wherein the electronic device is arranged to produce heated water and/or steam. Especially, the electronic device is selected from the group consisting of an iron, a pressurized steam generator, a non-pressurized steam generator (sometimes also indicated as a garment steamer), a hot liquid vending machine, an electric kettle, a coffee maker (drip filter), an espresso machine, a pad coffee machine, a washing machine, a dish washer, and a hot-water based weed killing device (sprayer).

As mentioned above, the herein defined voltage(s) (first AC and one or more of a second AC and DC) are preferably applied during heating of the aqueous liquid in the heater with the heating element. This may have the most impact in preventing and/or reduction of scaling on the heating element.

The AC voltages may (independently) have a sinusoidal wave shape or a triangular wave shape. The wave shapes may be symmetrical or asymmetrical. Asymmetrical triangular wave shapes are sometimes also indicated as saw tooth wave shapes. Preferably, the wave shapes are symmetrical. Further, as indicated above, preferably (symmetrical) triangular wave shapes are applied.

The first AC voltage, the DC voltage, and the optional further AC voltages are applied between the heating element and the counter electrode while the heating element and the counter electrode are in contact with the aqueous liquid. The aqueous liquid may be heated (as indicated above)(preferably with the heating element), while the voltages are applied.

In an embodiment, the method further includes a measurement of the conductivity of the aqueous liquid, and optionally of other parameters, and optionally controlling the first AC voltage and one or more of the second AC voltage and the DC voltage in dependence of the measurement and predefined relations between the conductivity (and the optional other parameters) and the first AC voltage and one or more of the second AC voltage and the DC voltage. One or more optional other parameters that may be measured may be selected from the group consisting of the temperature of the aqueous liquid, the pH of the aqueous liquid, the current that is running (between the heating element and the counter electrode), the voltage drop when connecting the two electrodes (i.e. the heating element and the counter electrode), etc.

Typically, the current density (i.e. between the heating element and the counter electrode) is in the range of 0.1-10 mA/cm$^2$, especially 0.1-5 mA/cm$^2$, such as especially 0.2-0.6 mA/cm$^2$, when using a flat heating element or a spiral shaped heating element in a boiler system, or especially 0.2-5 mA/cm$^2$ for a flow through heater.

The electrical power supply can be any system that is able to generate a first AC voltage and one or more of a second AC voltage and a DC voltage offset. Optionally, one or more of the frequency of the first AC, the peak to peak voltage of the first AC, the frequency of the second AC (if applicable), the peak to peak voltage of the second AC, and the voltage of the DC (if applicable), are variable and controllable, for instance one or more may be controlled in relation to a parameter like electric conductivity of the liquid and/or temperature of the liquid, or the current that is running. The term electrical power supply may in an embodiment also refer to a plurality of electrical power supplies. In principle, each voltage may be generated by a different electrical power supply.

Hence, the invention especially provides the use of a combination of a first AC voltage and one or more of a second AC voltage (and optionally one or more further AC voltages) and a DC voltage to a metal heating element of a heater arranged for heating an aqueous liquid (and arranged to be in contact with the aqueous liquid), to prevent or reduce scaling on the metal heating element, especially during heating of the aqueous liquid with the heating element in the heater. In a specific embodiment, both AC voltages and the DC voltage are applied.

The application of the voltage(s) may be applied preferably permanently during the time the aqueous liquid is at elevated temperatures, but may in an embodiment also be applied periodically. Optionally, the voltage(s) are applied before or after heating of the aqueous liquid. However, best results are obtained when the voltage(s) are applied at least during heating of the aqueous liquid.

Preferred conditions with respect to the voltage(s) and frequencies are indicated in the table below:

| | 1$^{st}$ AC + optionally DC + 2$^{nd}$ AC | | | |
| --- | --- | --- | --- | --- |
| | 1$^{st}$ AC | DC | 2$^{nd}$ AC | Ratio 1$^{st}$ AC frequency/2$^{nd}$ AC frequency |
| Applied frequency | ≥1 Hz; especially 5-500 Hz | n.a. | 0.02 Hz-5 Hz, especially 0.1 Hz-2 Hz | 2-1000; especially 5-500. |
| voltage | | 1.0-10 V; especially 1.2-6 V | | |

Other preferred conditions are indicated in the next table below:

| Water conductivity | Water temperature |
| --- | --- |
| 100-50,000 µS/cm | 50° C.-boiling temperature; especially ≥85° C. |

The term "substantially" herein, will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices (such as the heater arrangement) herein are amongst others described during operation (i.e. especially heating the aqueous liquid). As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1A:
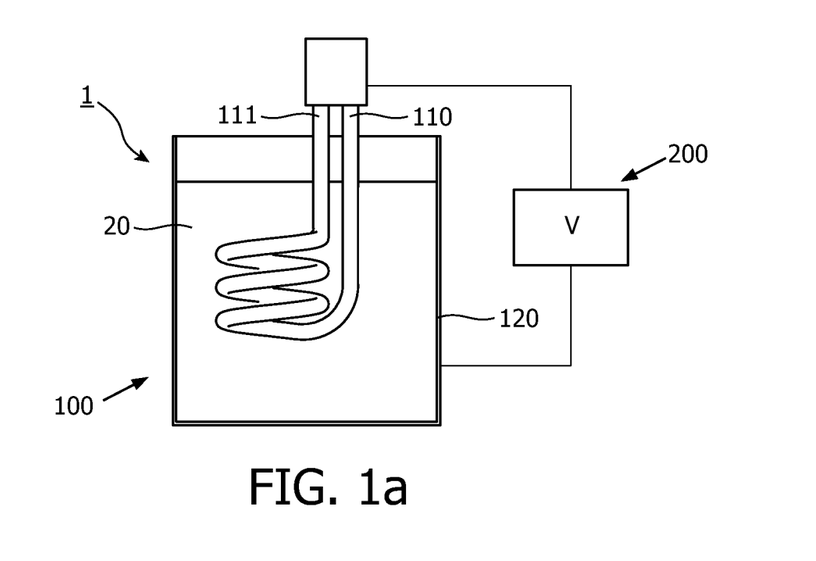
FIGS. 1a-1f schematically depict some possible configurations of a heater arrangement where the heating element is immersed in the water or where the heating element is a wall of a water heater.

FIG. 1a schematically depicts a water heater arrangement ("heater arrangement") 1 comprising a water heater ("heater") 100, arranged for heating an aqueous liquid 20. The aqueous liquid 20, especially water, is contained in the heater 100. The heater 100 comprises a metal heating element 110 to heat the aqueous liquid 20 in the heater 100. The heater arrangement 1 further comprises an electrical power 200 supply, arranged to apply a first AC voltage between the heating element 110 and a counter electrode 120. In addition to the first AC voltage a second, lower frequency AC voltage may be added and/or a DC voltage. When a DC voltage is applied, the heating element 110 is chosen as positive electrode. By application of the voltage(s), the metal heating element 110 is protected against scaling and/or scaling formed may be removed. FIG. 1a schematically depicts an embodiment wherein the heating element 110 is a submerging/immersion heating element, indicated with reference 111. The wall (or at least part of it) of the heater 100 is used as counter electrode in this embodiment. The wall may for instance be of steel as conductive material. Typically stainless steel is used with Cr, Ni as alloying elements (e.g. 304) or with additional Mo added (e.g. 316). Alternatively more resistant metal (alloys) can be used like Inconel (Cr/Ni alloy).

Figure 1B:
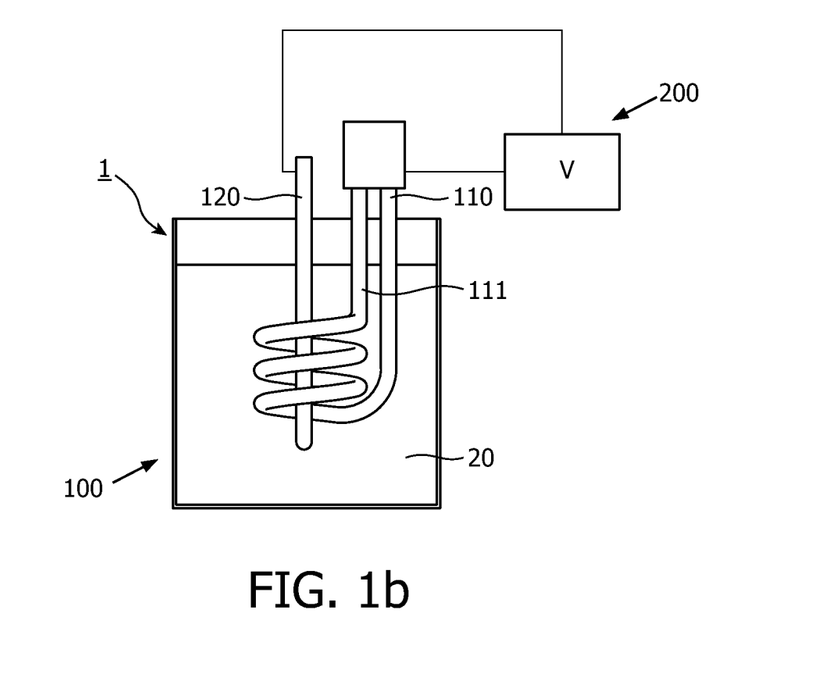

FIG. 1b schematically depicts a heater arrangement 1 wherein the heating element 110 is a curled immersed heating element, and wherein the counter electrode 120 is partly surrounded by at least part of the submerging heating element 111. In this case the counter electrode can be of stainless steel or Inconel or other oxidation resistant electrode material like titanium, platinum, mixed metal oxide coated titanium, platinum coated titanium or carbon based.

Figure 1C:
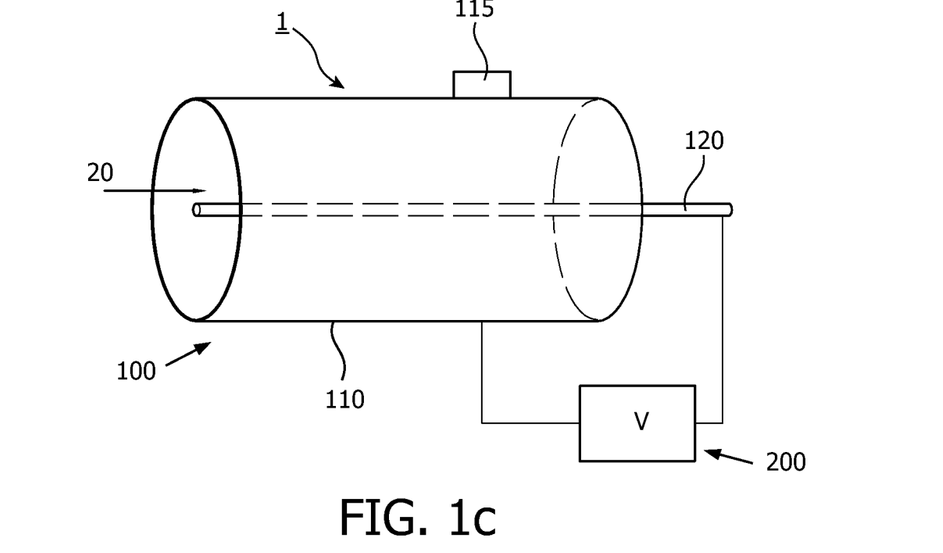

FIG. 1c schematically depicts an embodiment of a flow through heater (FTH), wherein the heater 100 is a heater through which the aqueous liquid 20 flows, while being heated. In the schematic embodiment of FIG. 1c, a heat generation device 115 is connected to the wall of the heater 100, and a rod within the heater is used as counter electrode 120. The wall is connected to an generation device 115 to heat the wall and is preferably of (stainless) steel; the wall is in contact with the aqueous liquid (not depicted) and is thus used as heating element 110. The counter electrode 120 may comprise a material as indicated in the description above for FIG. 1b.

Figure 1D:
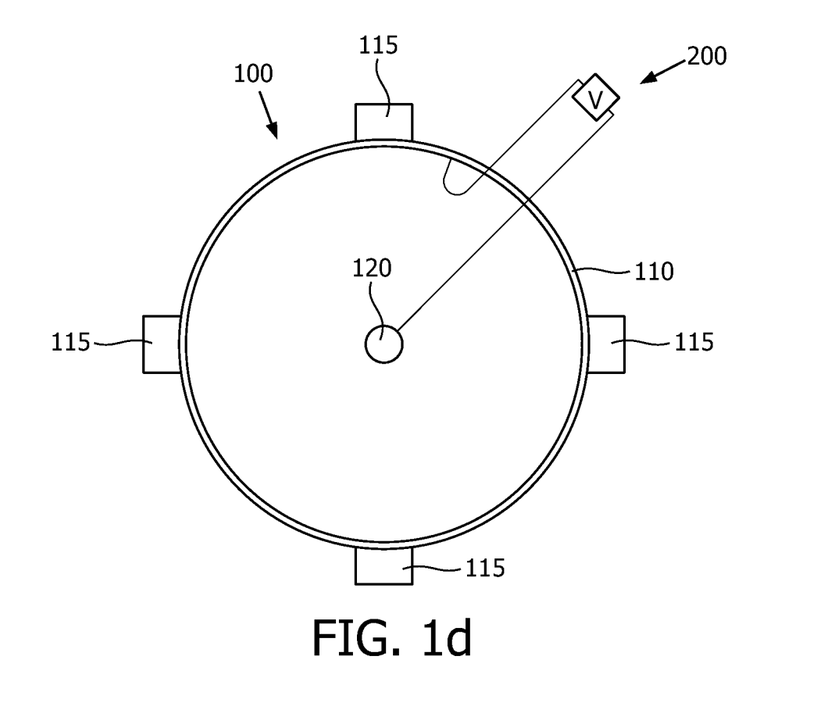

FIG. 1d schematically depicts substantially the same embodiment as schematically depicted in FIG. 1c, but now in cross-sectional view. Elements 115 heat wall of the heater 100. Therefore, the wall is indicated as heating element 110. Over this wall, i.e. heating element 110, and the counter electrode 120, a voltage is applied with electrical power supply 200. Here, the wall is used as heating element 110, and is preferably of (stainless) steel. The counter electrode 120 may comprise a material as indicated in the description above for FIG. 1b.

Figure 1E:
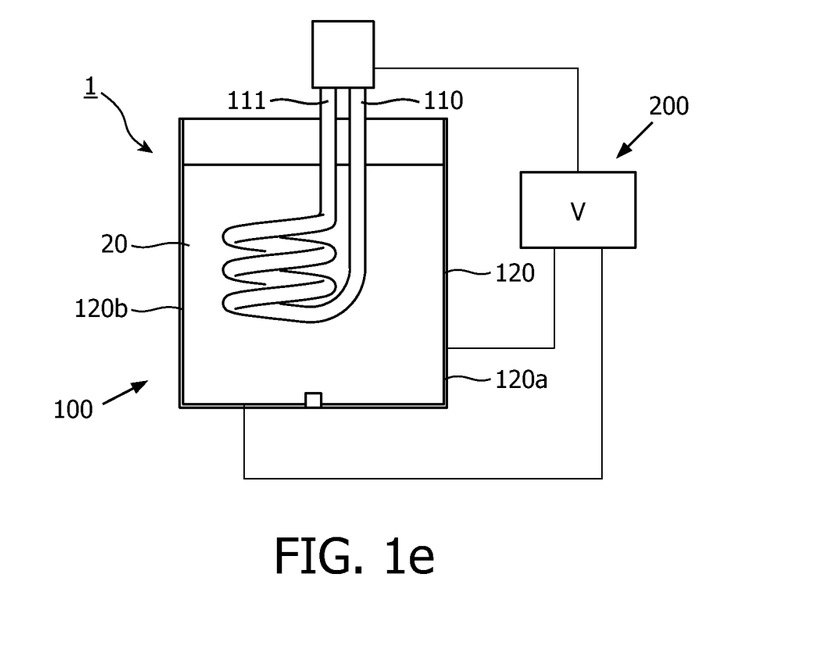

FIG. 1e schematically depicts substantially the same embodiment as schematically depicted in FIG. 1a, with the difference that two counter electrodes are applied, indicated with references 120a and 120b. Here, the wall is used as counter electrode 120, and thus comprises two (or more) isolated parts that are used as counter electrodes. For instance, when a first AC and a second AC are imposed over the counter electrode(s) and the heating element 110, the first AC may be applied over the heating element 110 and the first counter electrode, indicated with reference 120a, and the second AC may be applied over the heating element 110 and the second or further counter electrode, indicated with reference 120a.

Figure 1F:
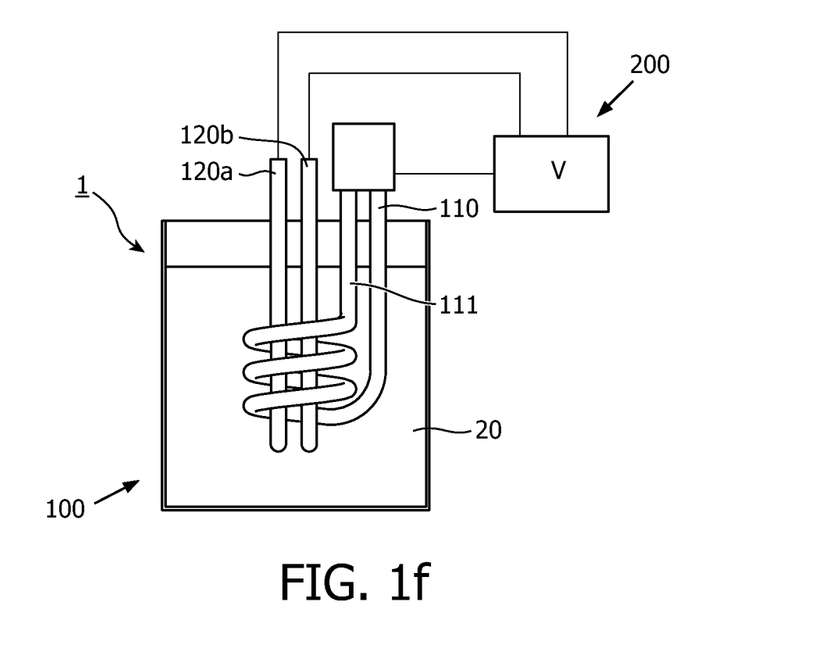

FIG. 1f schematically depicts substantially the same embodiment as schematically depicted in FIG. 1b. Here, also two counter electrodes (120) are used (like in schematic FIG. 1e), indicated with references 120a and 120b. As indicated above, when for instance a first AC and a second AC are imposed over the counter electrode(s) and the heating element 110, the first AC may be applied over the heating element 110 and the first counter electrode, indicated with reference 120a, and the second AC may be applied over the heating element 110 and the second or further counter electrode, indicated with reference 120a.

The voltages applied with the electrical power supply (or supplies) may be AC/AC and optional further AC components, and AC/AC/DC and optional further AC components.

Figure 2A:
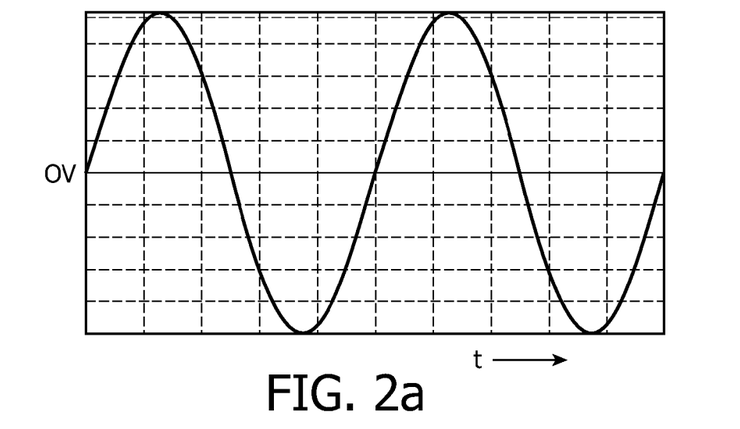
FIGS. 2a-2g schematically depict some examples of DC and AC voltages that may be applied.
Figure 2B:
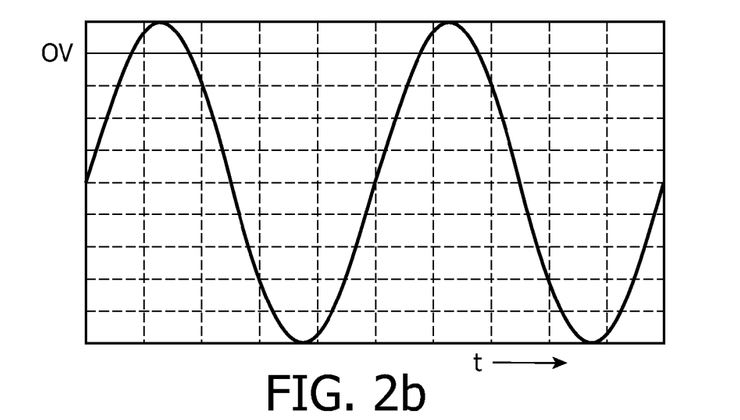
Figure 2C:
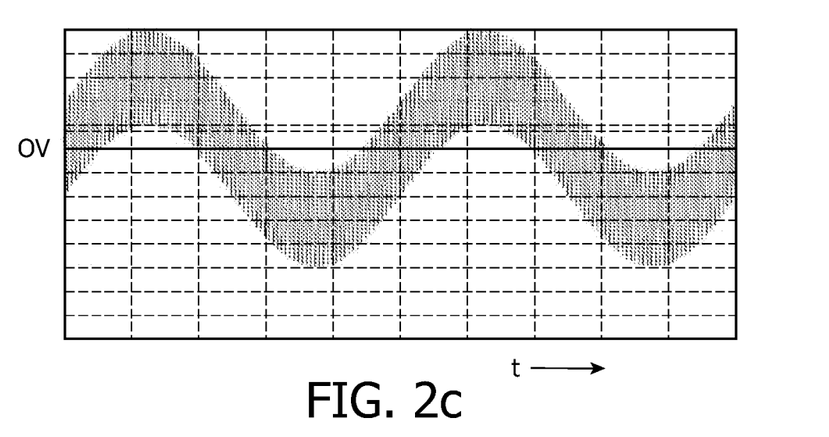
Figure 2D:
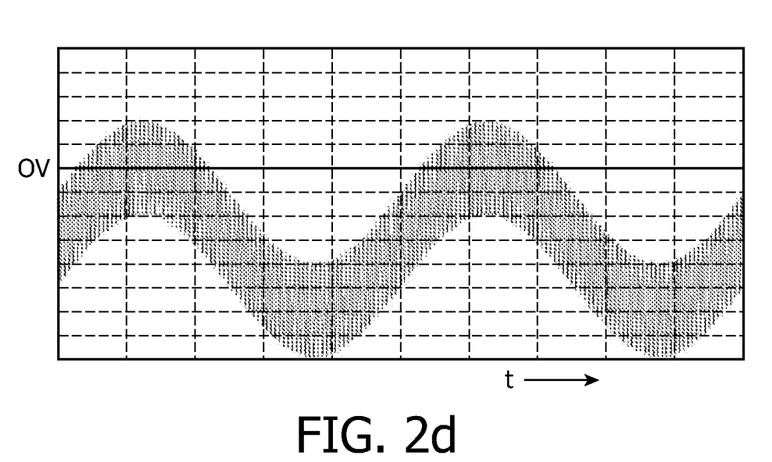
Figure 2E:
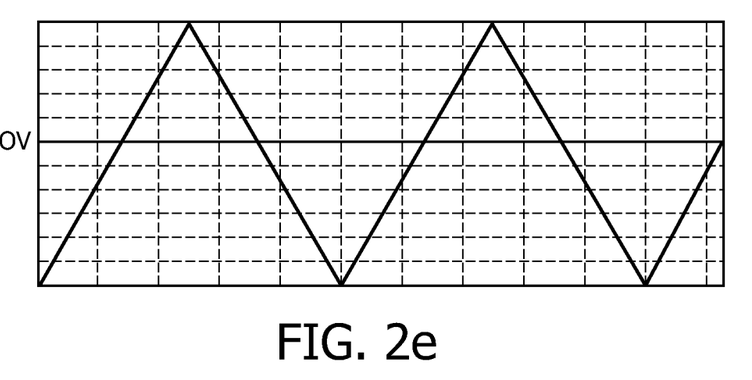
Figure 2F:
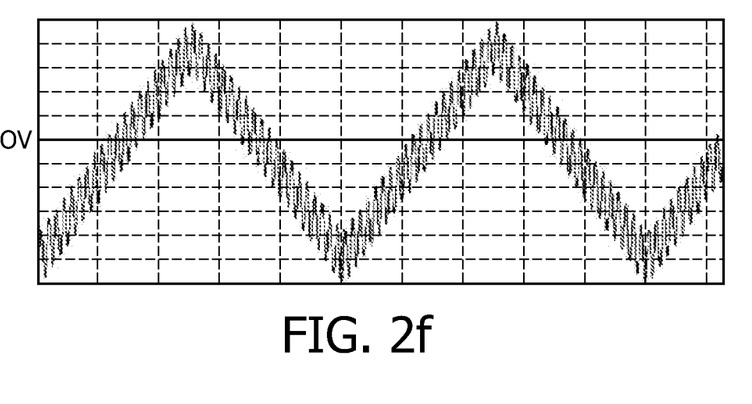
Figure 2G:
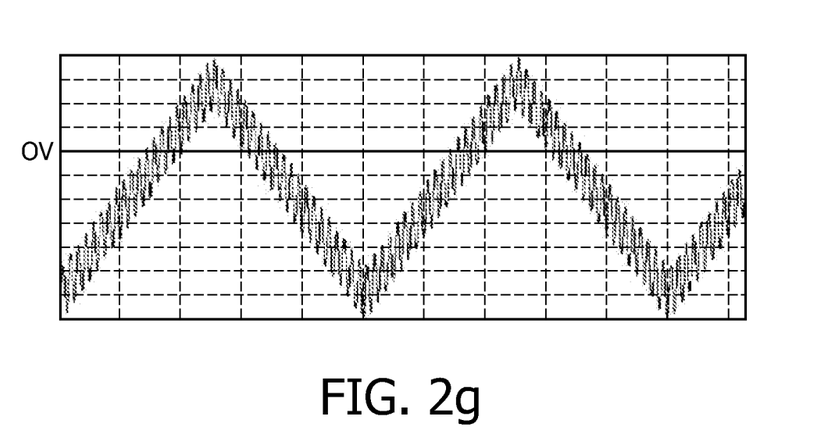

FIG. 2a schematically depicts an AC voltage signal, with time on the x-axis and the voltage on the y-axis. The peak to peak voltage is 10 units in this schematic figure. FIG. 2b schematically depicts the same AC voltage signal, but now with a DC voltage superimposed on the AC voltage (i.e. AC/DC). The DC voltage is negative, and the whole signal shifts to the negative. Preferably, the heating element is chosen as positive electrode, and the counter electrode is chosen as negative electrode (with respect to the application of the DC voltage). FIG. 2c schematically depicts an AC/AC signal, with a fast component and a slow component. FIG. 2d schematically depicts the same AC/AC signal as in FIG. 2c, but now with a DC voltage superimposed on the AC voltage (i.e. AC/AC/DC). The DC voltage is negative, and the whole signal shifts to the negative. Here, by way of example sinusoidal AC voltages are applied. Preferably, the AC voltages have a triangular wave shape, thus with substantially flat ramps. FIG. 2e schematically depicts such signal. In FIG. 2e the signal is symmetric. This however does not preclude the use of asymmetric signals (with non identical slopes). Superimposed thereon can a second (slower) AC and/or a DC voltage be applied. The second AC may also have a triangular wave shape. FIG. 2f schematically depicts AC/AC voltages both having a triangular wave shape, and FIG. 2g schematically depicts the same, but now including a DC offset.

Figure 3:
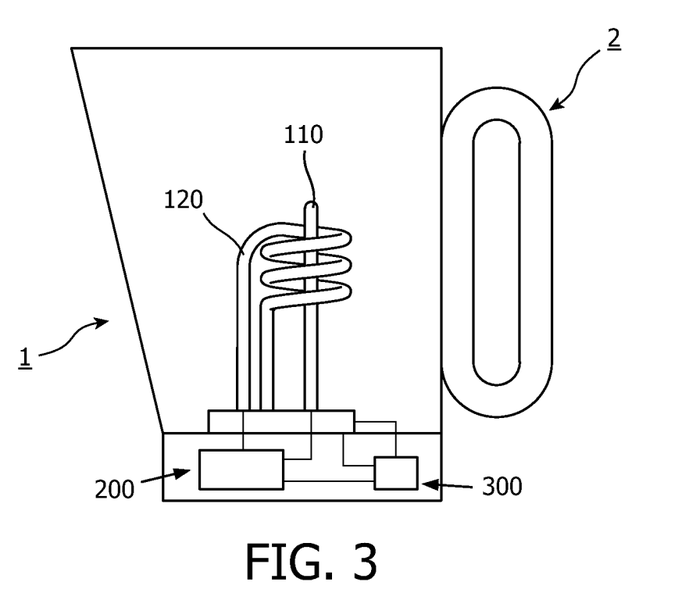
FIG. 3 schematically depicts an embodiment of an electronic device comprising the heater arrangement.

FIG. 3 schematically depicts an electronic device 2. FIG. 3 schematically depicts an electric kettle as example of the electronic device 2. The electronic device 2 comprises the heater arrangement 1. Here, electronics 300 may be arranged to control the heating of heating element 120 and provide power to the electric power supply 200 for imposing the first AC and optional second AC and/or optional DC voltage to the heating element 120 and counter electrode 110.

The heater arrangement 1 may further comprise a sensor (not depicted) to sense parameters like conductivity of the aqueous liquid, the temperature of the aqueous liquid, etc. Further, the heater arrangement 1 may further comprise a controller, to control the one or more features of the first AC and one more features of the one or more of the second AC and DC. The controller may control those one or more features in dependence of the one or more parameters and one or more predefined relations between the one or more parameters and the one or more features.

EXAMPLES

Water Preparation

Stock solutions of $CaCl_2 \cdot 2H_2O$ (65.6 gr/ltr), $MgSO_4 \cdot 7H_2O$ (38 gr/ltr) and $NaHCO_3$ (76.2 gr/ltr) were made. Standard hard water was made by mixing 50 gram of each stock solution into 9 liter of de-ionized water and adding up to 10 liter. The resulting water had a total hardness of (around) 16.8° DH (German degree of hardness) and a temporary hardness of (around) 11.2° DH.

Total hardness is defined as 2.8×2×[mmol/ltr Ca+mmol Mg/ltr]; Temporary hardness is defined as 2.8×[mmol $HCO_3^-$/ltr].

Calcified Electrode Preparation

In a typical experiment hard water was added to a 250 ml beaker glass. A curled heating element (of stainless steel) was immersed into the water. Water was boiled and kept at 95° C. for 30 minutes. During heating a stainless steel tube of 12 mm diameter and a 1 mm Metal oxide (MMO) coated Titanium electrode were immersed in the water at 5 cm depth. The distance between the electrodes was 1 cm. Both electrodes were electrically connected at 4.5 V DC with the stainless steel set as negative electrode. Scale deposited on the tube and adhered firmly.

Descaling Experiments

For every experiment a freshly calcified electrode (the stainless steel tube) was used. For the experiments the same setup was used as for calcifying the test electrode. After boiling for 30 minutes the electrode (the stainless steel tube) was investigated for spontaneous removal of the scale and for corrosion. After that the electrode (the stainless steel tube) was rinsed under running tap water with gentle rubbing to further test the loosening of the scale.

Experiment 1 (AC) (Reference Example)

A calcified 12 mm stainless steel tube and a small strip of MMO coated titanium of 6 mm width (the counter electrode) were connected to a power supply. 6.8 Vpp was applied with a frequency of 100 Hz resulting in 40 mA current. (As power source a function generator was used with 50 Ohm impedance). After heating for 30 minutes at 95° C. the outside of the tube (the electrode) was checked. No spontaneous scale removal was observed. Rinsing under tap water with gentle rubbing showed poor removal of scale. No corrosion was observed.

Experiment 2 (AC) (Reference Example)

A calcified 12 mm stainless steel tube and a small strip of MMO coated titanium of 6 mm width were connected to a power supply. 6.8 Vpp was applied with a frequency of 10 Hz resulting in 40 mA current. After heating for 30 minutes at 95° C. the electrode was checked. No spontaneous scale removal was observed. Rinsing under tap water with gentle rubbing showed good removal of scale. No corrosion was observed.

Experiment 3 (AC) (Reference Example)

A calcified 12 mm stainless steel tube and a small strip of MMO coated titanium of 6 mm width were connected to a power supply. 6.8 Vpp was applied with a frequency of 5 Hz resulting in 40 mA current. After heating for 30 minutes at 95° C. the electrode was checked. Scale had loosened from the metal tube spontaneously. Rinsing under tap water with gentle rubbing showed very good removal of scale beyond the spontaneous cleaned area. No corrosion was observed.

Experiment 4 (AC) (Reference Example)

A calcified 12 mm stainless steel tube and a small strip of MMO coated titanium of 6 mm width were connected to a power supply. 6.8 Vpp was applied with a frequency of 2.5 Hz resulting in 40 mA current. After heating for 30 minutes at 95° C. the electrode was checked. Scale had loosened from the metal tube spontaneously Rinsing under tap water with gentle rubbing showed very good removal of scale beyond the spontaneous cleaned area. A slight yellow color was observed on the tube indicating the beginning of corrosion.

When the frequency is lowered too much corrosion of the steel electrode may occur suggesting that lower current may be beneficial.

Experiment 5 (AC) (Reference Example)

A calcified 12 mm stainless steel tube and a small strip of MMO coated titanium of 6 mm width were connected to a power supply. 4.8 Vpp was applied with a frequency of 2.5 Hz resulting in 20 mA current. After heating for 30 minutes at 95° C. the electrode was checked. Scale had loosened from the metal tube spontaneously Rinsing under tap water with gentle rubbing showed good removal of scale beyond the spontaneous cleaned area. No corrosion was observed.

To evaluate the effect of a DC current the following experiments 6-8 were performed.

Experiment 6 (DC) (Reference Example)

A calcified 12 mm stainless steel tube and a small strip of MMO coated titanium of 6 mm width were connected to a power supply. 0.3 V DC was applied resulting in 0.1 mA current. After heating for 30 minutes at 95° C. the electrode was checked. Rinsing under tap water with gentle rubbing showed poor removal of scale. There was no spontaneous removal of scale. No corrosion was observed.

In DC descaling experiments, the stainless steel tube is used as positive electrode and the counter electrode, the MMO coated titanium, as negative electrode.

Experiment 7 (DC) (Reference Example)

A calcified 12 mm stainless steel tube and a small strip of MMO coated titanium of 6 mm width were connected to a power supply. 0.6 V DC was applied resulting in 0.3 mA current. After heating for 30 minutes at 95° C. the electrode was checked. Rinsing under tap water with gentle rubbing showed limited removal of scale. There was no spontaneous removal of scale. No corrosion was observed.

Experiment 8 (DC) (Reference Example)

A calcified 12 mm stainless steel tube and a small strip of MMO coated titanium of 6 mm width were connected to a power supply. 1.0 V DC was applied, with the stainless steel tube as positive electrode. Immediately pitting corrosion was observed at the stainless steel tube. After 2 minutes the experiment was stopped. Rinsing under tap water with gentle rubbing showed poor removal of scale. There was no spontaneous removal of scale.

Higher voltages were not pursued. The poor efficiency in decalcification and the sensitivity to corrosion of DC only are clearly demonstrated in experiment 6-8.

Experiment 9 and 10 show the benefit of adding additional AC signal to counter the possible oxidation side effect of a single AC signal with too low frequency.

Experiment 9 (AC) (Reference Example)

A calcified 12 mm stainless steel tube and a MMO coated Ti rod of 6 mm were connected to a power supply. 9.0 Vpp AC was applied with a frequency of 5 Hz resulting in 40 mA current. After heating for 30 minutes at 95° C. the electrode was checked. Scale had loosened from the metal tube spontaneously. Rinsing under tap water with gentle rubbing showed very good removal of scale beyond the spontaneous cleaned area. The tube had obtained a yellow colour cast due to oxidation of the metal Experiment 10 (AC/AC)

A calcified 12 mm stainless steel tube and a MMO coated Ti rod of 6 mm were connected to a power supply. 9.0 Vpp AC was applied with a frequency of 5 Hz resulting in 40 mA current. Superimposed was an AC signal of 100 Hz. After heating for 30 minutes at 95° C. the electrode was checked. Scale had loosened from the metal tube spontaneously. Rinsing under tap water with gentle rubbing showed very good removal of scale beyond the spontaneous cleaned area. No color cast was observed on the metal.

Calcified Electrode Preparation

In a typical experiment hard water was added to a 600 ml beaker glass. A curled heating element was immersed into the water. Water was boiled and kept at 95 C for 30 minutes. During heating a stainless steel tube of 12 mm diameter and 10 mm inner diameter was immersed into the water. A 1 mm Metal oxide (MMO) coated Titanium electrode was positioned in the center of the tube. Both electrodes were electrically connected at 3.5 V DC with the stainless steel set as negative electrode. Scale deposited on the inside of the tube and adhered firmly.

Experiments 11 and 12 show the influence of water conductivity on descaling and corrosion behavior at very low frequency in combination with an offset. Experiments 13 and 14 show the benefit of additional AC signal on prevention of corrosion.

Experiment 11 (AC/DC)(Reference Example)

A calcified (inside) 12 mm stainless steel tube and a 6 mm diameter rod of stainless steel centered inside were connected to a power supply after immersion in standard hard water of 900 µS/cm conductivity. At 95° C. a current of 40 mA was applied at a measured 2.6 Vpp, with a frequency of 0.5 Hz and an offset of −1.5V DC (with the stainless steel tube as positive electrode and the rod as negative counter electrode). After heating for 30 minutes the tube and the rod were checked. All scale had been removed while signs of corrosion were observed.

Experiment 12 (AC/DC)(Reference Example)

The same experiment as experiment 11 was repeated in water of 300 µS/cm conductivity (water with relatively low hardness). A voltage of 3.8 V was applied to obtain the same current. After heating for 30 minutes at 95° C. the tube and the rod were checked. All scale had been removed and no corrosion was detected.

Experiment 13 (AC/AC/DC)

A calcified 12 mm stainless steel tube and a 6 mm diameter rod of stainless steel centered inside were connected to a power supply after immersion in water of 900 µS conductivity. A current of 40 mA was applied with a frequency of 0.5 Hz and an offset of −1.5V DC. Superimposed onto the signal was added a signal of the same amplitude but with zero offset and a frequency of 2.5 Hz. After heating for 30 minutes at 95° C. the tube and the rod were checked. All scale had been removed and no corrosion was detected showing the benefit of an additional AC current.

Experiment 14 (AC/AC/DC)

A calcified 12 mm stainless steel tube and a 6 mm diameter rod of stainless steel centered inside were connected to a power supply after immersion in water of 900 µS conductivity. At 95° C. a current of 40 mA was applied with a frequency of 0.5 Hz and an offset of −1.5V DC. Superimposed onto the signal was added a signal of the same amplitude but with zero offset and a frequency of 1000 Hz. After heating for 30 minutes at 95° C. the tube and the rod were checked. All scale had been removed and no corrosion was detected showing the benefit of an additional AC current.

In the following experiments the curled heating element was used as electrode.

Calcified Heating Element Preparation

In a typical experiment hard water was added to a 600 ml beaker glass. A curled heating element (stainless steel) was immersed into the water to heat the water. Water was kept at 95° C. for 30 minutes. During heating an L-shape MOX coated Ti electrode was positioned inside the heating element. The heating element and the counter electrode were connected to a power supply at 3.5 V DC with the element connected as the negative electrode. Scale deposited on the heating element and adhered firmly.

Experiment 15 (AC/AC/DC)

A calcified heating element was immersed in standard hard water of 900 µS. An L-shape stainless steel electrode of 6 mm diameter was positioned inside the element. A current of 40 mA was applied to the system using 2 ramp shape AC signals of respectively 0.25 and 2.5 Hz and an offset of −2.5 V DC (with the curled heating element as positive electrode and the L-shape stainless steel electrode as negative counter electrode). After heating for 30 min the element and electrode were checked. Scale had been removed and no corrosion was detected. Same results were obtained when the offset was increased up to −4.0 V DC.

Experiment 16 (AC/AC/DC)

In the middle of a flow through heater tube with length of 18 cm and inner diameter of 12 mm was positioned a mixed metal oxide (MMO) coated titanium rod of 2 mm diameter. During 30 minutes hard water was pumped through the heater at 140 ml/min. The water left the tube at a temperature of 95° C. A DC voltage of 3.5 V was applied during the heating with the heater as negative electrode and the counter electrode as the positive electrode. Scale deposited on the wall of the heater.

After the calcification two superimposed frequencies of 0.1 and 1 Hz were applied. The offset was 2.5 V with the heater as positive electrode. A current of 130 mA was measured giving a current density of around 2 mA/cm$^2$ on the wall of the heater. After pumping and heating hard water again for 30 min the tube was observed to have been decalcified. At 190 mA (2.8 mA/cm$^2$) similar results were observed.

Experiment 17 (AC/AC/DC)

A stainless steel cylindrical shaped cup with a heating element connected at the outside of the flat bottom was filled with hard water. The radius of the bottom was 5.25 cm. At 3 mm distance from the bottom a stainless steel spiral electrode of 2 mm wire thickness was positioned. The water was heated while two super imposed AC signals (triangular shape) of 1 and 1000 Hz were applied. An offset of 1.5 V was used with the cup as positive electrode. A current of 78 mA was measured giving a current density taking only the bottom into account of 0.9 mA/cm$^2$. Taking the whole cup into account with a water level of 3 cm the current density on the wall of the cup was 0.4 mA/cm$^2$. After 20 minutes heating the cup was emptied. No scale had adhered to the wall. At 56 mA (0.3 mA/cm$^2$) similar results were obtained.

The invention claimed is:

1. A method of operating a water heater including a heating element arranged for heating aqueous liquid in the water heater, the method comprising:
   a. heating aqueous liquid in contact with the heating element
   b. applying a first AC voltage between the heating element and a counter electrode that is in contact with the aqueous liquid, said first AC voltage having a predetermined wave shape with a first frequency; and
   c. simultaneously applying a second AC voltage between the heating element and the counter electrode, said second AC voltage having a predetermined wave shape and a second frequency;
   where the second frequency is in a range of 0.02 Hz-5 Hz and the first frequency is at least twice the second frequency.

2. The method according to claim 1, where the first frequency is at least 1 Hz.

3. The method according to claim 1, and including applying a DC voltage between the heating element and the counter electrode, where the DC voltage is at least 0.5 V, and where the heating element is operated as a positive electrode.

4. The method according to claim 1, where the water heater includes first and second counter electrodes and where:
   a. the first AC voltage is applied between the heating element and the first counter electrode;
   b. the second AC voltage is applied between the heating element and the second counter electrode; and c. a DC voltage is applied between the heating element and one of the first and second counter electrodes.

5. The method according to claim 1 where the first AC voltage is superimposed on the second AC voltage.

6. The method according to claim 1 and including heating the aqueous liquid in the water heater to a temperature of at least 85° C.

7. The method according to claim 1 where at least one of the first and second AC voltages has a triangular wave shape.

8. The method according claim 1 and including measuring the aqueous liquid conductivity and controlling the first AC voltage and the second AC voltage at least in part in dependence on the measured aqueous liquid conductivity.

9. The method according to claim 1 and including measuring the aqueous liquid conductivity and at least one other parameters of the aqueous liquid selected from the group consisting of temperature of the aqueous liquid, pH of the aqueous liquid, electric current that is conducted between the heating element and the counter electrode, voltage drop when connecting the heating element and the counter electrode to a source of electrical power and controlling the first AC voltage and the second AC voltage in dependence on the measurements.

10. A water heater for heating an aqueous liquid, said water heater comprising:
   a. a container for holding the aqueous liquid;
   b. a heating element disposed for contacting and heating the aqueous liquid in the container;
   c. a counter electrode disposed for contacting the aqueous liquid in the container; and
   d. an electrical power supply adapted to simultaneously apply between the heating element and the counter electrode;
      a first AC voltage having a predetermined wave shape with a first frequency; and
      a second AC voltage having a predetermined wave shape with a second frequency;
   where the second frequency is in a range of 0.02 Hz-5 Hz, and the first frequency is at least twice the second frequency.

11. The water heater according to claim 10 where the first frequency is at least 1 Hz.

12. The water heater according to claim 10 where the electrical power supply is adapted to apply a DC voltage between the heating element and the counter electrode, where the DC voltage is at least 0.5 V and where the heating element is operated as a positive electrode.

13. The water heater arrangement according to claim 10 and including first and second counter electrodes, where the electrical power supply is adapted to;
   a. apply the first AC voltage between the heating element and the first counter electrode;
   b. apply the second AC voltage between the heating element and the second counter electrode; and
   c. apply a DC voltage between the heating element and one of the first and second counter electrodes.

14. The water heater as in claim 10, where said water heater is adapted to produce at least one of heated water and steam.

15. A method as in claim 1 where at least one of the first and second AC voltages has a triangular wave shape.

16. A method as in claim 1 where at least one of the first and second AC voltages has a sinusoidal wave shape.

17. A water heater as in claim 10 where the first and second AC voltages each have a triangular wave shape.

18. A water heater as in claim 10 where the first and second AC voltages each have a sinusoidal wave shape.

* * * * *